United States Patent
Gubbi (12)

(10) Patent No.: US 6,463,473 B1
(45) Date of Patent: Oct. 8, 2002

(54) CONFIGURING A WIRELESS COMPUTER NETWORK TO ALLOW AUTOMATIC ACCESS BY A GUEST CLIENT DEVICE

(75) Inventor: Rajugopal R. Gubbi, Fair Oaks, CA (US)

(73) Assignee: Sharewave, Inc., El Dorado Hills, CA (US)

( * ) Notice: Subject to any disclaimer, the term of this patent is extended or adjusted under 35 U.S.C. 154(b) by 0 days.

(21) Appl. No.: 09/289,163

(22) Filed: Apr. 9, 1999

(51) Int. Cl.[7] ............................................. G06F 15/173
(52) U.S. Cl. ...................... 709/225; 709/223; 379/93.02
(58) Field of Search .................................. 709/220, 223, 709/225, 227, 229, 218; 710/104; 370/389, 254; 379/93.02; 713/200

(56) References Cited

U.S. PATENT DOCUMENTS

| | | | |
|---|---|---|---|
| 5,659,685 A | * 8/1997 | Williams et al. | 709/220 |
| 5,748,629 A | * 5/1998 | Caldara et al. | 370/389 |
| 5,768,542 A | * 6/1998 | Enstrom et al. | 710/104 |
| 5,796,827 A | * 8/1998 | Coppersmith et al. | 713/182 |
| 5,845,065 A | * 12/1998 | Conte et al. | 713/200 |
| 5,944,794 A | * 8/1999 | Okamoto et al. | 709/225 |
| 6,023,498 A | * 2/2000 | Schneider | 379/93.02 |
| 6,085,236 A | * 7/2000 | Lea | 709/220 |
| 6,118,768 A | * 9/2000 | Bhatia et al. | 370/254 |
| 6,119,001 A | * 9/2000 | Delis et al. | 455/433 |
| 6,125,388 A | * 9/2000 | Reisman | 709/218 |

FOREIGN PATENT DOCUMENTS

| | | |
|---|---|---|
| DE | 19738707 A1 | 8/1997 |
| WO | WO98/49817 | 4/1998 |

OTHER PUBLICATIONS

PCT "*International Search Report*" Sep. 4, 1999.

* cited by examiner

*Primary Examiner*—Zarni Maung
*Assistant Examiner*—Wen-Tai Lin
(74) *Attorney, Agent, or Firm*—Blakely, Sokoloff Taylor & Zafman LLP

(57) ABSTRACT

A network is configured so as to allow access by a client device for a limited period of time. During this period of time, the client device may have access to designated network resources. In some cases, the network may be so configured on-the-fly; that is, it may be configured to allow access by the client device in response to an installation request transmitted by the client device to a network master device. Such an installation request should include a unique identifier associated with the client device. This unique identifier may be broadcast by the client device without a prompt by the network master device. The use of a unique identifier allows for recognizing the guest client and further facilitates updating a client table wherein information regarding the available bandwidth for the guest client device may be stored. Upon expiration of the period of time, the guest client may be automatically uninstalling from the network.

28 Claims, 2 Drawing Sheets

CONFIGURING A WIRELESS COMPUTER NETWORK TO ALLOW AUTOMATIC ACCESS BY A GUEST CLIENT DEVICE

This application is related to and hereby claims the priority benefit of the filing date of co-pending application Ser. No. 09/151,579, entitled "Method and Apparatus for Accessing a Computer Network Communication Channel", filed Sep. 11, 1998, and assigned to the Assignee of the present invention.

FIELD OF THE INVENTION

The present invention relates generally to a scheme for installing client devices within a computer network and, in particular, to such installations that are to be temporary in nature.

BACKGROUND

In the above-cited co-pending application Ser. No. 09/151,579, entitled "Method and Apparatus for Accessing a Computer Network Communication Channel", filed Sep. 11, 1998, and assigned to the Assignee of the present invention, which is incorporated herein by reference in its entirety, a computer network adapted for use in the home environment was described. That architecture included a number of network components arranged in a hierarchical fashion and communicatively coupled to one another through communication links operative at different levels of the hierarchy. At the highest level of the hierarchy, a communication protocol that supports dynamic addition of new network components at any level of the hierarchy according to bandwidth requirements within a communication channel operative at the highest level of the network hierarchy is used. Preferably, the communication channel is supported on a wireless communication link.

The generalization of this network structure is shown in FIG. 1. A subnet 10 includes a server 12. In this scheme, the term "subnet" is used describe a cluster of network components that includes a server and several clients associated therewith (e.g., coupled through the wireless communication link). Depending on the context of the discussion however, a subnet may also refer to a network that includes a client and one or more subclients associated therewith. A "client" is a network node linked to the server through the wireless communication link. Examples of clients include audio/video equipment such as televisions, stereo components, satellite television receivers, cable television distribution nodes, and other household appliances.

Server 12 may be a separate computer that controls the communication link, however, in other cases server 12 may be embodied as an add-on card or other component attached to a host computer (e.g., a personal computer) 13. Server 12 has an associated radio 14 (half- or full-duplex), which is used to couple server 12 wirelessly to the other nodes of subnet 10. The wireless link generally supports both high and low bandwidth data channels and a command channel. Here a channel is defined as the combination of a transmission frequency (more properly a transmission frequency band) and a pseudo-random (PN) code used in a spread spectrum communication scheme. In general, a number of available frequencies and PN codes may provide a number of available channels within subnet 10. As is described in the co-pending application cited above, servers and clients are capable of searching through the available channels to find a desirable channel over which to communicate with one another.

Also included in subnet 10 are a number of clients 16, some of which have shadow clients 18 associated therewith. A shadow client 18 is defined as a client which receives the same data input as its associated client 16 (either from server 12 or another client 16), but which exchanges commands with server 12 independently of its associated client 16. Each client 16 has an associated radio 14, which is used to communicate with server 12, and some clients 16 may have associated subclients 20. Subclients 20 may include keyboards, joysticks, remote control devices, multi-dimensional input devices, cursor control devices, display units and/or other input and/or output devices associated with a particular client 16. A client 16 and its associated subclients 20 may communicate with one another via communication links 22, which may be wireless (e.g., infra-red, ultrasonic, spread spectrum, etc.) communication links.

Each subnet 10 is arranged in a hierarchical fashion with various levels of the hierarchy corresponding to levels at which intra-network component communication occurs. At a highest level of the hierarchy exists the server 12 (and/or its associated host 13), which communicates with various clients 16 via the wireless radio channel. At other, lower levels of the hierarchy the clients 16 communicate with their various subclients 20 using, for example, wired communication links or wireless communication links such as infra-red links.

Where half-duplex radio communication is used on the wireless link between server 12 and clients 16, a communication protocol based on a slotted link structure with dynamic slot assignment is employed. Such a structure supports point-to-point connections within subnet 10 and slot sizes may be re-negotiated within a session. Thus a data link layer that supports the wireless communication can accommodate data packet handling, time management for packet transmission and slot synchronization, error correction coding (ECC), channel parameter measurement and channel switching. A higher level transport layer provides all necessary connection related services, policing for bandwidth utilization, low bandwidth data handling, data broadcast and, optionally, data encryption. The transport layer also allocates bandwidth to each client 16, continuously polices any under or over utilization of that bandwidth, and also accommodates any bandwidth renegotiations, as may be required whenever a new client 16 comes on-line or when one of the clients 16 (or an associated subclient 20) requires greater bandwidth.

As explained in the above-cited co-pending application, at initial start up the network must be installed. This involves initiating a list of clients 16 at the host computer 13 (e.g., to enable the server 12 to reject connection request from any uninstalled clients whose properties and bandwidth requirements will be unknown to the host computer 13); distributing client IDs among the clients 16 (e.g., to avoid any confusion among the clients 16 regarding the expected data from the server 12 and their respective transmission slots); and forming a table of estimated bandwidth requirements for each client 16 (e.g., to enable the server 12 to on-line pre-compute any bandwidth requirements before a connection is granted to any particular client 16). Before any new client 16 is added to the subnet 10, the list of recognized clients at the host computer 13 must be updated. This may be done directly by a user at the host computer 13 or, in some cases, may be accomplished remotely, so long as the client ID is provided to both the server 12 and the new client 16.

By maintaining an up-to-date client list or database, subnet 10 may be configured on-the-fly as clients 16 log-on and/or log-off. For example, installed clients may not be active and so need not be allocated bandwidth within the communication channel. As these clients come on-line, however, they will require such bandwidth. To avoid lengthy delays in having to install a client each time it wakes up, the client list provides a readily available access point for server 12 to quickly determine the client's bandwidth and other requirements. The client list also serves to authenticate clients so as to prevent unauthorized access to the subnet 10. In the past, however, when a user wished to remove a client from the client list, this de-installation process required manual input to delete the undesired client's information.

SUMMARY OF THE INVENTION

In one embodiment, a network is configured so as to allow access by a client device for a limited period of time. During this period of time, the client device may have access to designated network resources. In some cases, the network may be so configured on-the-fly, that is, it may be configured to allow access by the client device in response to an installation request transmitted by the client device to a network master device. Such an installation request should include a unique identifier associated with the client device. This unique identifier may be broadcast by the client device without a prompt by the network master device. The use of a unique identifier allows for recognizing the guest client and further facilitates updating a client table wherein information regarding the available bandwidth for the guest client device may be stored. Upon expiration of the period of time, the guest client may be automatically uninstalled from the network.

These and other features and advantages of the present invention will be apparent from a review of the detailed description and its accompanying drawings that follow.

BRIEF DESCRIPTION OF THE DRAWINGS

The present invention is illustrated by way of example, and not limitation, in the figures of the accompanying drawings in which.

DETAILED DESCRIPTION

Figure 1:
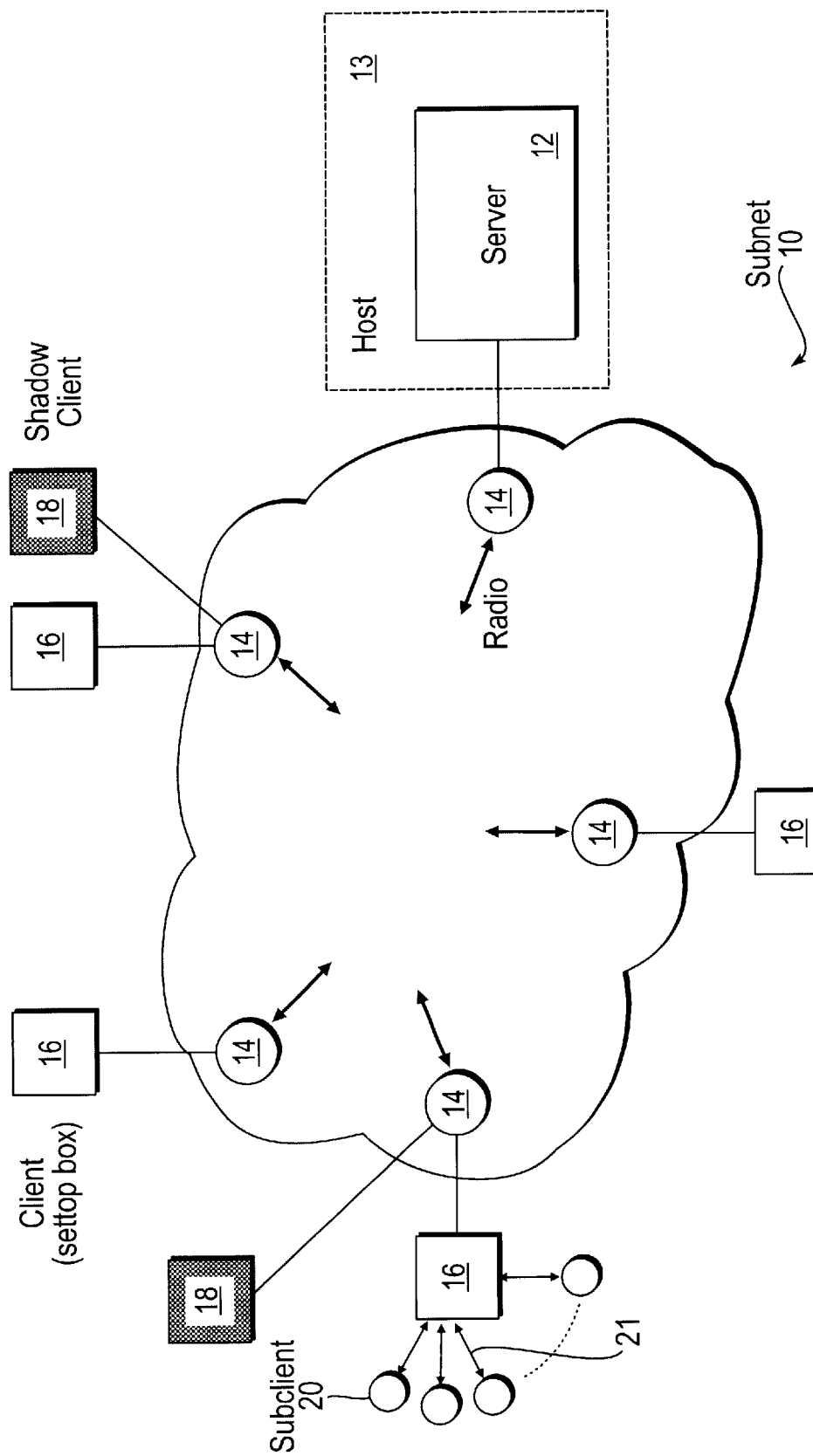
FIG. 1 illustrates a generalized network structure that is supported by a wireless communication link.

Described herein is a scheme for allowing the temporary installation and subsequent removal of guest clients within a wireless computer network. The present scheme is generally applicable to a variety of wireless network environments, but finds especially useful application in a computer network which is located in a home environment. Thus, the present scheme will be discussed with reference to the particular aspects of a home environment. However, this discussion should in no way be seen to limit the applicability of the present invention to other network environments and the broader spirit and scope of the present invention is recited in the claims which follow this discussion.

The present scheme allows subnet 10 (or, more particularly, server 12) to support a special type of client device, hereinafter referred to as a "guest client". A guest client may be any device that may operate as a client 16 (or subclient 20 or shadow client 18) within a subnet 10, but it is recognized that the guest client will only be used for a short period of time within the subnet. For example, consider a situation where a guest arrives at a house that has a previously installed subnet. The guest will be staying only for a few days, but wishes to use his/her notebook computer to connect to the Internet. Assuming the guest's notebook computer is configured to allow connection to subnet 10 (e.g., the notebook computer may have an associated radio that allows for operation within the subnet), then the notebook computer may be added as a guest client.

Although it is true that the notebook computer could be added as a regular client 16 of subnet 10, installation as a guest client is preferable in this instance. First, by installing the notebook computer as a guest client, the regular user of subnet 10 (i.e., the home owner) will be spared the necessity of uninstalling the notebook computer from the subnet after the guest leaves. At the time the notebook computer is installed as a guest client, certain device parameters are specified. These parameters include the period of time that the guest client will be permitted to access the subnet. After this period, the network master device (i.e., server 12) will automatically delete the guest client from its client table, denying any connection to the subnet from the guest client thereafter.

In addition to this time-out period, other services that the guest device will be permitted to access can be configured by the user at the time of installation. For example, the minimum/maximum bandwidth allocations and/or audio/video services of the subnet that the guest client will be allowed can be set. Preferably, the guest client device will not be designated as an alternate network master (or, indeed, the primary network master) device. This will ensure that network security is not compromised and will also avoid a situation where the guest client is operating as a network master device at the time it is automatically uninstalled from the subnet. Once installed, the guest device may avail itself of the user-designated services of the subnet for the specified period of time.

As indicated above, network installation generally involves creating a list of clients at the host computer 13. This list enables the master node (e.g., server 12) to reject connection request from any uninstalled client, whose properties and bandwidth requirements will be unknown to the host computer. It also provides for retrieving the Client IDs from the clients. As explained in the above-cited co-pending application, Client IDs are unique identifiers that are assigned and stored in the client devices during manufacture. The use of unique Client IDs allows for controlling communications within the subnet 10.

In addition to a bare list of client devices, the host 13 also stores a table of client properties, including the estimated bandwidth requirements for each client. This enables the master node to pre-compute the clients' bandwidth requirements before any connections are granted to any particular clients. This table may also have fields to indicate whether a client device can be used as an application server and/or as an alternate master device of the network. The client property and client name lists may be combined in a single table to conserve storage space and it is this/these list(s) that are updated when a guest client is installed. As indicated above, guest client entries will also be tagged with a time-out parameter (e.g., data and/or time or a number of connect hours permitted) to allow for the automatic de-installation discussed above.

Guest clients may be installed in a subnet in any of a number of ways. For example, a guest client may be installed through user involvement. In this process, a user manually provides the network master device (e.g., server 12) with the Client ID and/or other properties of the guest device, thus allowing the network master to update the client list maintained by the host 13. Once the client list has been updated, the network master will recognize the guest client when the guest client comes on-line in the fashion described in the above-mentioned co-pending application for on-line client insertion.

Note, in this process, when the guest client first powers up, it must be provided with the link ID and or subnet ID for the subnet. The subnet ID is assumed to be unique to the link/subnet. Uniqueness may be assured by requiring a user to supply a unique 9 digit password (e.g., a Social Security Number (SSN)) during the subnet installation process. This number may be converted to HEX format and a portion of the resulting number chosen as the subnet ID. This remains the same for all sessions unless the user decides to de-install/re-install the entire subnet. Link IDs may be common to one or more subnets.

Figure 2:
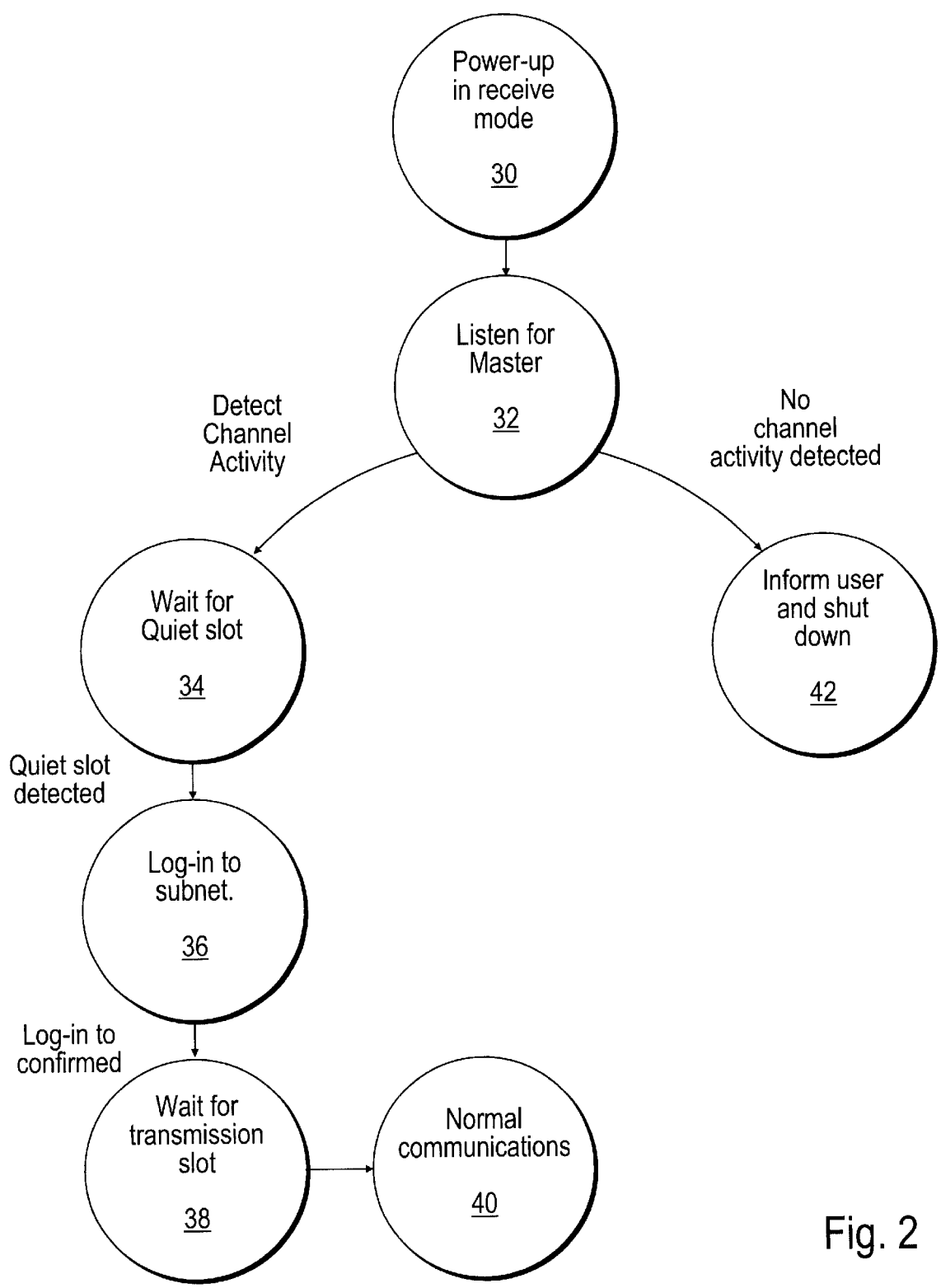
FIG. 2 is a state diagram illustrating a process for adding a guest client to a subnet in accordance with one embodiment of the present invention.

Briefly, and as shown in FIG. 2, where a guest client is just coming on-line and is seeking admission to the subnet, it starts out in a receive mode (state 30) and listens to a channel (state 32). If the guest client detects activity on the channel, it waits for quiet slot (i.e., a period of time where, according to the subnet's communication protocol, no existing client or server transmissions occur) (state 34) and begins logging-in to the subnet (state 36). Note, although not shown in the diagram, where a guest client is attempting to come on-line during a channel changing operation, it may need to follow the channel change as described for a regular client in the above-cited co-pending application. These details are not presented here to avoid unnecessary complication.

The log-in process begins with the guest client sending a Connection Request (CRQ) packet to the server 12. In response, server 12 checks the consistency of the incoming request (e.g., by sending the same request addressed to transmitting client periodically, perhaps once every frame, until a response is received). Once the guest client's request is confirmed (e.g., by receipt of a confirmation packet from the guest client), the server 12 sends a Connection Agreements (CAG) package to the guest client. This package includes, among other things, information regarding the forward and backward bandwidth (e.g., the time slots of the channel) to which the guest client is entitled. In addition, the maximum number of bytes the guest client can send/expect in each data packet is set for each type of packet (e.g., video data, audio data, etc.).

The Connection Agreements package may also contain information regarding the total number of data frames that the guest client needs to wait from the start of server's transmission and the identification of the preceding client (i.e., the client that owns the preceding reverse transmission slot). All clients honor their respective connection agreements by counting the number of data frames they receive from the start of the server's transmission and start their respective transmissions after the end of last data frame received from the preceding client. While counting, if a client comes across a Token Pass command transmitted by the preceding client, then that client stops counting and immediately starts its own transmission.

After receiving the Connection Agreements packet, the guest client configures itself to transmit its data in its assigned time slot and waits for that slot to come around (state 38). At the designated time slot, the guest client may initiate normal communications with the server 12 (state 40) and transmit any data or commands it may have. Where no master is detected in any available channel, the guest client may so notify a user and shut down (state 42).

In other cases, a guest client may be installed on-the-fly, through an open communication channel. In this case, the use may prompt the network master device to detect guest clients (e.g., through an on-screen user interface) and may also provide configuration information such as the allowed services and expiration time discussed above. In response, the master device may initiate detection operations in the open channel. In response to the master device, the guest client may broadcast its client ID to the network master node in the open communication channel. Upon receiving this client ID, the network master supplies the guest client with the link ID/subnet ID used by the subnet and adds the guest client to its client list. Further, the master device may download the user-supplied configuration information to the guest client at that time. After receiving the link ID/subnet ID, and other information, the guest client may log-in to the subnet in the fashion described above.

Thus, a scheme for allowing the installation (and removal) of guest clients for a wireless computer network been described. The advantage of guest client support is that users may now install and use any outside device in existing networks and need not explicitly uninstall those devices at a later time. This improves the mobility of the devices from network to network, wherever and whenever required. Although discussed with reference to certain illustrated embodiments, the present invention should not be limited thereby. Instead, the present invention should only be measured in terms of the claims that follow.

What is claimed is:

1. A method of configuring a wireless computer network to allow automatic access to the wireless computer network by a guest client device for a limited period of time in response to an installation request transmitted by the guest client device to a master device at the wireless computer network, the method comprising:

recognizing an installation request from the guest client device, the installation request including a unique identifier;

locating a client table record associated with the guest client device, the client table record maintained at the network master device;

utilizing the client table record to establish a network communication agreement with the guest client device; and transmitting the network communication agreement to the guest client device.

2. The method of claim 1 wherein establishing a network communication agreement comprises specifying transmission times to be used by the guest client device, wherein the transmission times are obtained from the client table record associated with the guest client device.

3. The method of claim 1 wherein establishing a network communication agreement comprises specifying which resources are available to the guest client device, wherein the available resources are obtained from the client table record associated with the guest client device.

4. The method of claim 1 wherein the unique identifier is broadcast by the guest client device without a prompt by the network master device.

5. The method of claim 1 wherein recognizing an installation request from the guest client device comprises comparing the unique identifier supplied by the guest client device against unique identifiers assigned to client records stored at the network master device.

6. The method of claim 1 further comprising automatically uninstalling the guest client device from the wireless computer network upon the expiration of an amount of network access time available to the guest client device, wherein the amount of network access time available to the guest client device is specified in the network communication agreement.

7. The method of claim 1 wherein the client table record comprises data provided by a user to the network master device prior to the guest client device attempting an installation request, the data including a unique ID associated with the guest client device and values for one or a plurality of the other fields in the client table record.

8. The method of claim 1 wherein the client table record comprises a new client table record created and assigned to the guest client device in response to the guest client device attempting an installation request, the new client table record to include default values in each of the record's fields.

9. The method of claim 8 wherein prior to the guest client device attempting an installation request the network master device did not have a client table record associated with the guest client device.

10. The method of claim 1 wherein the client table record comprises a client record created through a series of communications with the guest client device.

11. The method of claim 10 wherein prior to the guest client device attempting an installation request the network master device did not have a client table record associated with the guest client device.

12. The method of claim 1 further comprising storing information regarding the available bandwidth for the guest client device in the client table record associated with the guest client device.

13. The method of claim 12 comprising designating available bandwidth to the guest client device based on the client table record after the guest client device's request for access to the wireless computer network has been negotiated.

14. The method of claim 1 wherein the wireless computer network comprises a computer network adapted for use in a home environment.

15. The method of claim 1 wherein the wireless computer network comprises a computer network adapted for use in a commercial environment.

16. The method of claim 1 wherein the wireless computer network comprises an intranet.

17. The method of claim 1 wherein the wireless computer network comprises a subnet.

18. The method of claim 1 wherein a plurality of guest client devices may access the wireless computer network.

19. A method of configuring a wireless computer network to allow a guest client device to be installed on-the-fly, the method comprising:
providing an open communication channel at the wireless computer network;
listening at a network master device to the open communication channel for guest client devices wishing to join the wireless computer network;
receiving a guest client device's client ID at the network master device, the client ID broadcast by a guest client device wishing to join the wireless computer network;
adding the guest client device to the wireless computer networks client list at the network master device; and
providing the guest client device with access time information, a list of services which the guest client device is permitted to access, and an ID allowing the guest client device to login to the wireless computer network.

20. The method of claim 19 further comprising automatically uninstalling the guest client device from the wireless computer network upon expiration of the amount of network access time available to the guest client device specified in the network communication agreement.

21. The method of claim 19 wherein the unique identifier is broadcast by the guest client device without a prompt by the network master device.

22. The method of claim 19 further comprising storing information regarding the available bandwidth for the guest client device in the client table record associated with the guest client device.

23. The method of claim 22 comprising designating available bandwidth to the guest client device based on the client table record after the guest client device's request for access to the wireless computer network has been negotiated.

24. The method of claim 19 wherein the wireless computer network comprises a computer network adapted for use in a home environment.

25. The method of claim 19 wherein the wireless computer network comprises a computer network adapted for use in a commercial environment.

26. The method of claim 19 wherein the wireless computer network comprises an intranet.

27. The method of claim 19 wherein the wireless computer network comprises a subnet.

28. The method of claim 19 wherein a plurality of guest client devices may access the wireless computer network.

* * * * *